(12) United States Patent
Fayerweather et al.

(10) Patent No.: US 12,252,430 B2
(45) Date of Patent: Mar. 18, 2025

(54) SYSTEM FOR PREHEATING GLASS MELTING FURNACE BATCH MATERIALS

(71) Applicant: Owens-Brockway Glass Container Inc., Perrysburg, OH (US)

(72) Inventors: Carl L. Fayerweather, Maumee, OH (US); Dale A. Gaerke, Perrysburg, OH (US); Robert Roth, Fremont, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 16/910,282

(22) Filed: Jun. 24, 2020

(65) Prior Publication Data

US 2020/0317556 A1 Oct. 8, 2020

Related U.S. Application Data

(60) Continuation-in-part of application No. 16/860,228, filed on Apr. 28, 2020, now Pat. No. 11,358,896, (Continued)

(51) Int. Cl.
C03B 3/02 (2006.01)
C03B 1/00 (2006.01)
C03B 5/235 (2006.01)

(52) U.S. Cl.
CPC .............. C03B 3/023 (2013.01); C03B 1/00 (2013.01); C03B 5/235 (2013.01); C03B 2211/00 (2013.01)

(58) Field of Classification Search
None
See application file for complete search history.

(56) References Cited

U.S. PATENT DOCUMENTS 3,373,007 A * 3/1968 Ticknor ................. C03B 5/24
65/161
RE29,622 E 5/1978 Lange
(Continued)

FOREIGN PATENT DOCUMENTS

CL 2020001950 A1 1/2021
CN 1703600 A 11/2005
(Continued)

OTHER PUBLICATIONS

International Search Report and Written Opinion, Int. Application No. PCT/US2019/014397, Int. Filing Date: Jan. 21, 2019, Applicant: Owens-Brockway Glass Container Inc., Mail Date: Apr. 9, 2019.
(Continued)

*Primary Examiner* — Queenie S Dehghan

(57) ABSTRACT

A system for preheating batch materials in a glass melting furnace includes: a preheater configured to receive unheated batch materials and to deliver heated batch materials, the preheater including an outlet configured to exhaust fluid from the preheater and an inlet configured to receive exhaust fluid from the glass melting furnace and exhaust fluid recirculated from the outlet of the preheater; a fan configured to provide ambient air to a furnace flue; a valve configured to control an amount of the ambient air to the furnace flue; a temperature sensor configured to sense temperature of exhaust gases in the furnace flue; and a temperature controller configured to control the valve and the fan responsive to the temperature sensed by the temperature sensor.

18 Claims, 3 Drawing Sheets

Related U.S. Application Data which is a division of application No. 15/879,233, filed on Jan. 24, 2018, now Pat. No. 10,669,183.

(56) References Cited

U.S. PATENT DOCUMENTS

| | | | |
|---|---|---|---|
| 4,113,459 | A | 9/1978 | Mattmuller |
| 4,166,421 | A | 9/1979 | Stribling |
| 4,184,861 | A | 1/1980 | Erickson et al. |
| 4,374,660 | A | 2/1983 | Sakhuja et al. |
| 4,797,092 | A | 1/1989 | Pieper |
| 4,875,919 | A | 10/1989 | DeSaro et al. |
| 5,125,943 | A | 6/1992 | Cole |
| 5,290,334 | A | 3/1994 | Alexander |
| 5,439,496 | A | 8/1995 | Pieper |
| 5,556,443 | A | 9/1996 | Alexander |
| 5,779,748 | A | 7/1998 | Alexander |
| 5,807,418 | A | 9/1998 | Chamberland et al. |
| 5,855,656 | A | 1/1999 | Alexander |
| 5,954,851 | A | 9/1999 | Sakae |
| 6,615,612 | B2 | 9/2003 | Alexander |
| 8,176,754 | B2 | 5/2012 | Jensen et al. |
| 10,669,183 | B2 | 6/2020 | Fayerweather et al. |
| 2001/0008076 | A1* | 7/2001 | Alexander ............... C03B 3/023 65/27 |
| 2009/0274985 | A1 | 11/2009 | McKnight et al. |
| 2011/0023485 | A1 | 2/2011 | Schubert |
| 2013/0309622 | A1 | 11/2013 | Lindig et al. |
| 2014/0215842 | A1 | 8/2014 | Hogan |
| 2014/0224638 | A1 | 8/2014 | Carson et al. |
| 2014/0227548 | A1 | 8/2014 | Myrick |
| 2015/0068253 | A1 | 3/2015 | Johnson et al. |
| 2016/0298610 | A1* | 10/2016 | Liu ............... F24S 60/00 |
| 2018/0017330 | A1* | 1/2018 | Gunner ............... C03B 3/023 |
| 2019/0225525 | A1 | 7/2019 | Fayerweather et al. |
| 2019/0225526 | A1 | 7/2019 | Mastek et al. |
| 2020/0255314 | A1 | 8/2020 | Fayerweather et al. |
| 2020/0317556 | A1 | 10/2020 | Fayerweather et al. |

FOREIGN PATENT DOCUMENTS

| | | |
|---|---|---|
| CN | 101558015 A | 10/2009 |
| CN | 201834844 U | 5/2011 |
| CN | 106477851 A | 3/2017 |
| DE | 10029983 A1 | 1/2002 |
| EP | 3743387 B1 | 11/2022 |
| GB | 1531896 | 11/1978 |
| WO | 2007024687 A2 | 3/2007 |
| WO | 2019147514 A1 | 8/2019 |

OTHER PUBLICATIONS

EP Office Action, Application No. 19704923.2-1105, Applicant: Owens-Brockway Glass Container Inc., Dated: Jul. 7, 2021.
CL Office Action, Application No. 202001949, Applicant: Owens-Brockway Glass Container Inc., Dated: Jun. 29, 2021.
U.S. Office Action for U.S. Appl. No. 16/860,228 dated Nov. 9, 2021, 20 pages.
Chinese 1st Office Action, Application No. 201980021807.4, Filing Date: Jan. 21, 2019, Applicant: Owens-Brockway Glass Container Inc., Mail Date: Mar. 19, 2022.
Chilean Office Action (Informe Pericial), Chile Serial No. 202101683, Applicant: Owens-Brockway Glass Container Inc., Dated: Jul. 11, 2022.
Chilean Search Report (Informe de Busqueda), Chile Serial No. 22101683, Applicant: Owens-Brockway Glass Container Inc., Date: Jul. 11, 2022.
Chile Respuesta Pericial (Expert Response), Serial No. 202101683, Applicant: Owens-Brockway Glass Container Inc., Date: Nov. 9, 2022.
Chile Informe de Busqueda (Search Report), Serial No. 202101683, Applicant: Owens-Brockway Glass Container Inc., Date: Nov. 9, 2022.
Colombia Search Report, Application No. NC2020/0010254, Applicant: Owens-Brockway Glass Container Inc., Date: Dec. 9, 2022.
Brazil Preliminary Office Action, Application No. BR112020015124-6, Applicant: Owens-Brockway Glass Container Inc., Date: Jan. 4, 2023.
Extended European Search Report, Application No./Patent No. 22193730.3-1105/4137465, Applicant: Owens-Brockway Glass Container Inc., Dated: Mar. 28, 2023.
Indonesian Office Action, Serial No. P00202207456, Applicant: Owens-Brockway Glass Container Inc., Dated: Apr. 10, 2023.
Indonesian Office Action, Serial No. P00202207458, Applicant: Owens-Brockway Glass Container Inc., Dated: Apr. 10, 2023.
European Office Action, Application No. 22193730.3-1105, Applicant: Owens-Brockway Glass Container Inc., Dated: Feb. 26, 2024.
Canadian Office Action, Application No. 3,089,040, Applicant: wens-Brockway Glass Container Inc., Dated: Feb. 26, 2024.

* cited by examiner

SYSTEM FOR PREHEATING GLASS MELTING FURNACE BATCH MATERIALS

BACKGROUND a. Technical Field

This disclosure relates to systems for preheating batch materials before introduction to a glass melting furnace. In particular, the disclosure relates to a system for preheating batch materials in which the mass flow and/or temperature of exhaust fluids through the preheater and/or furnace charger are controlled in order to maximize energy transfer to the batch materials while protecting ductwork leading to and from the preheater and other components.

b. Background Art

In a glass melting furnace system, a preheater is often used to preheat batch materials that are then fed to a glass melting furnace along with other unheated batch materials. Heat in the preheater is generated, at least in part, by directing at least a portion of the exhaust fluid from the furnace to the preheater through ductwork. It is desirable to both maximize energy transfer from the exhaust fluid to the batch materials and, at the same time, protect the ductwork leading to and from the preheater and other components from excessive temperatures. Careful control is required to accomplish these goals because changes in the quality (e.g., moisture content and/or size) of the batch materials (particularly cullet) can substantially change the amount of heat transfer to the batch materials and, as a result, the temperature of exhaust fluids.

The inventors herein have recognized a need for a furnace system that will minimize and/or eliminate one or more of the above-identified deficiencies.

BRIEF SUMMARY OF THE DISCLOSURE

This disclosure relates to systems for preheating glass melting furnace batch materials. In particular, the disclosure relates a system for preheating batch materials in a glass melting furnace includes: a preheater configured to receive unheated batch materials and to deliver heated batch materials, the preheater including an outlet configured to exhaust fluid from the preheater and an inlet configured to receive exhaust fluid from the glass melting furnace and exhaust fluid recirculated from the outlet of the preheater; a fan configured to provide ambient air to a furnace flue; a valve configured to control an amount of the ambient air to the furnace flue; a temperature sensor configured to sense temperature of exhaust gases in the furnace flue; and a temperature controller configured to control the valve and the fan responsive to the temperature sensed by the temperature sensor.

The foregoing and other aspects, features, details, utilities, and advantages of the disclosed system will be apparent from reading the following detailed description and claims, and from reviewing the accompanying drawings illustrating features of this system by way of example.

DETAILED DESCRIPTION

Figure 1:
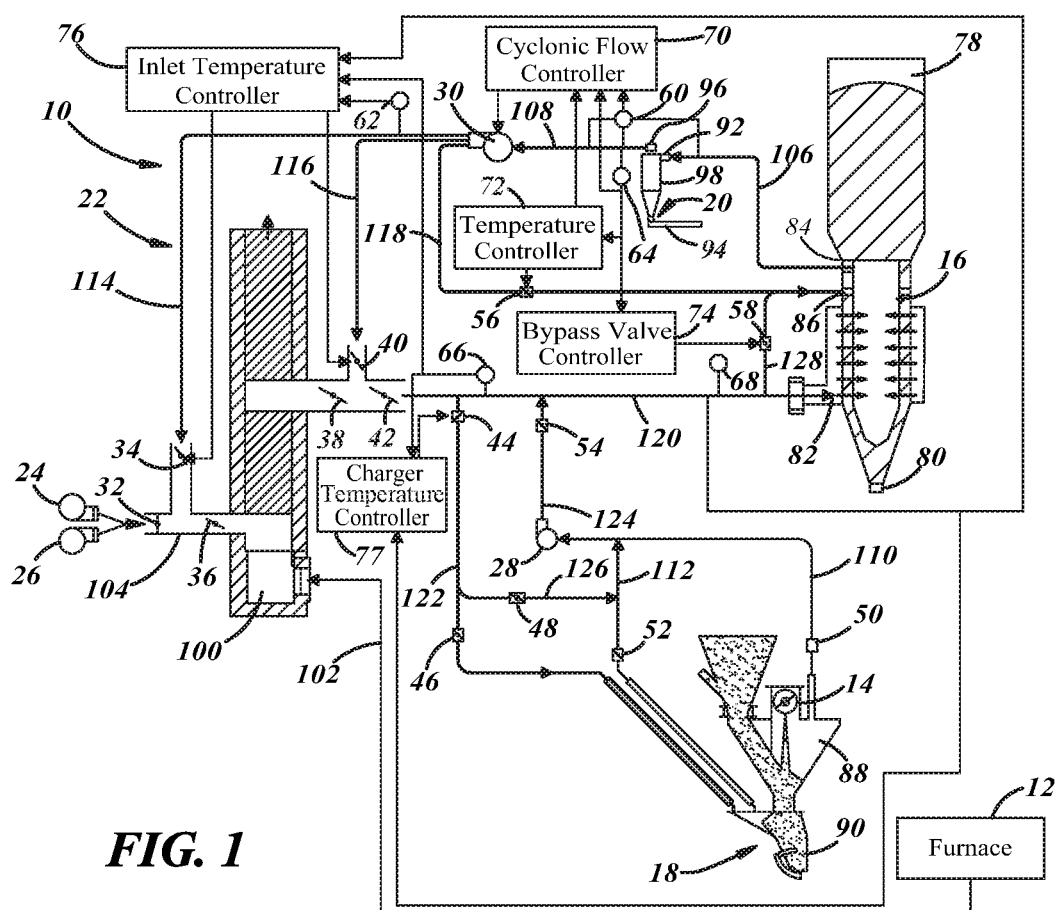
FIG. 1 is a schematic drawing of a furnace system incorporating a system for preheating cullet in accordance with one embodiment of the present teachings.

Referring now to the drawings wherein like reference numerals are used to identify identical components in the various views, FIG. 1 illustrates a furnace system 10 in accordance with one embodiment of the present teachings. System 10 is provided to melt raw materials for use in forming objects or products. System 10 may comprise, for example, a glass melting furnace system for use in melting silica sand, soda ash (sodium carbonate), limestone and other batch materials such as cullet (recycled broken glass) into molten glass. System 10 may include a furnace 12, a batch screw feeder 14, a batch materials preheater 16, a charger 18, a cyclonic separator 20, a duct system 22, a plurality of fans 24, 26, 28, 30, a plurality of valves 32, 34, 36, 38, 40, 42, 44, 46, 48, 50, 52, 54, 56, 58, pressure sensors 60, 62 temperature sensors 64, 66, 68 and various controllers 70, 72, 74, 76, 77.

Furnace 12 is provided to melt raw materials. Furnace 12 may comprise a glass melting furnace that melts batch materials including silica sand, soda ash, limestone and cullet into molten glass. Furnace 12 may have an operating temperature of about 1565 degrees Celsius (2850 degrees Fahrenheit). Furnace 12 may generate heat using natural gas and preheated combustion air. Furnace 12 may also augment the heat using an electric boost system. Excess heat may be exhausted from furnace 12 through duct system 22.

Batch screw feeder 14 is provided to direct raw batch materials (e.g., silica sand, soda ash and limestone) into charger 18. Although a screw feeder 14 is shown in the illustrated embodiment, it should be understood that a variety of mechanisms including chutes, conveyors and other structures may be used in addition to, or as an alternative to, screw feeder 14 to deliver batch material from one or more silos (not shown) to charger 18. Screw feeder 14 and/or other components of the batch delivery system may be controlled using conventional electromechanical controls that regulate the amount of batch material provided to charger 18 based on feedback signals from sensors used to monitor various conditions of the furnace 10, charger 18, or other structures in system 10.

Preheater 16 is provided to preheat materials before they are introduced into furnace 12 to improve the operating efficiency of furnace 12. In the glass melting furnace system referenced above, preheater 16 comprises a batch materials preheater that is configured to receive unheated batch materials and preheat the batch materials before delivering heated batch materials to furnace 12. The batch materials preheater 16 may comprise a direct contact raining bed counterflow preheater in which unheated batch materials are introduced at one end of the preheater 16 and travel through the preheater 16 under gravitational forces while heat is introduced into the opposite end of preheater 16 and flows in the opposite direction to the batch materials. It should be understood, however, that other conventional forms of preheaters 16, for cullet, raw batch materials, or the like may alternatively be used in glass melting furnace systems. Batch materials may be introduced to preheater 16 through a batch materials inlet 78 from one or more silos (not shown) and may exit an opposite end of the preheater 16 through a batch materials outlet 80 and be provided to charger 18. In between, batch materials flow through the preheater 16 around deflector plates. Heat, in the form of exhaust fluids from furnace 12, preheater 16 and charger 18 may be introduced to preheater 16 through a primary inlet 82 and exhausted through a primary outlet 84. As discussed hereinbelow, exhaust fluids may also be introduced to preheater 16 from furnace 12, preheater 16 and charger 18 through a bypass inlet 86 disposed between primary inlet 82 and primary outlet 84 relative to the direction of batch material flow in preheater 16.

Charger 18 is provided to feed a mixture of raw batch materials and cullet into furnace 12. Charger 18 may include a hopper 88 and a feed chamber 90. Hopper 88 is provided to combine streams of raw batch materials from batch screw feeder 14 and batch materials from preheater 16 and to direct the combined stream into feed chamber 90. Feed chamber 90 has an inlet end coupled to the outlet end of hopper 88. The inlet end is configured to receive the combined stream of raw batch materials and heated batch materials from hopper 88. Feed chamber 90 also has an outlet end through which a mixture of the raw batch material and the heated batch material is discharged from the feed chamber 90 into a molten bath in furnace 12 using, for example, vibratory movements or a reciprocating pushing movement.

Cyclonic separator 20 is provided to separate fine particulates, including glass fines, from the exhaust fluids generated by preheater 16. Cyclonic separator 20 defines an inlet 92 configured to receive exhaust fluids from the primary outlet 84 of the preheater 16. Cyclonic separator 20 further defines outlets 94, 96, at opposite ends of a cylindrical container 98 configured to discharge particulates and cleaned exhaust fluids, respectively. The configuration of the inlet 92 and shape of the container 98 establish a high speed rotating air flow within the container 98 that causes particulates in the exhaust fluid to be removed from the air flow and drop the bottom of the container where they may be removed through outlet 94 while cleaner air is exhausted from outlet 96. The particulates exiting outlet 94 may be directed to an inlet to batch screw feeder 14 to be mixed with the raw batch materials.

Duct system 22 is provided to route fluids between furnace 12, preheater 16, charger 18 and other components (not shown) of system 10 as well as the atmosphere (for air intake and byproduct exhaustion). Duct system 22 is made from materials sufficient to withstand the anticipated operating temperatures in the components of system 10 and may be made from steel in some embodiments. Fans, including fans 24, 26, 28, 30 may be used to introduce fluids to ducts within duct system 22 or to move fluids within duct system 22. Mechanically or electrically controlled valves, including valves 32, 34, 36, 38, 40, 42, 44, 46, 48, 50, 52, 54, 56, 58 may be disposed within duct system 22 to control the amount of fluid flowing to and from various components of furnace system 10. In the illustrated embodiment, duct system 22 includes a flue channel 100, a furnace exhaust duct 102, an air intake duct 104, a preheater exhaust duct 106, a cyclonic separator exhaust duct 108, charger exhaust ducts 110, 112, recirculation ducts 114, 116, 118, 120, 122, 124 and bypass ducts 126, 128. It should be understood, however, that additional ducts may form a part of duct system 22.

Flue channel 100 is provided to capture exhaust gases from furnace 12 and preheater 16. Flue channel 100 recycles a portion of the exhaust gases for use within portions of system 10 such as in preheating batch materials in preheater 16 or materials in charger 18. Flue channel 100 also provides a means for cooling the exhaust gases prior to reuse within system 10 and/or treatment by downstream filters, scrubbers and other energy recovery and pollution control equipment prior to exhausting the remaining fluids to atmosphere.

Furnace exhaust duct 102 is provided to transport exhaust fluids from furnace 10 to flue channel 100. Duct 102 is connected to flue channel 100 proximate one end of flue channel 100. Exhaust duct 102 may have a different composition in terms of material composition, shape (e.g., thickness), or other characteristics relative to other ducts within duct system 22 in order to adequately handle the relatively high temperature exhaust fluids exhausted from furnace 12.

Air intake duct 104 is provided to introduce ambient air or another fluid into flue channel 100 for mixing with furnace exhaust gases to cool the exhaust gases. In the illustrated embodiment, air intake duct 104 is connected to, and receives fluids from, recirculation duct 114 and may therefore provide ambient air, recirculated fluids, or a mixture of the two depending on the positions of valves 32, 34.

Preheater exhaust duct 106 and cyclonic separator exhaust duct 108 are provided to exhaust fluids from preheater 16 and cyclonic separator 20, respectively. Duct 106 extends between primary outlet 84 of preheater 16 and inlet 92 of cyclonic separator 20. Duct 108 extends between outlet 96 of cyclonic separator 20 and fan 30.

Charger exhaust ducts 110, 112 are provided to exhaust fluids from the hopper 88 and feed chamber 90, respectively, of charger 18. Duct 110, extends from hopper 88 to fan 28. Duct 112 extends from feed chamber 90 and intersects duct 110 between hopper 88 and fan 28.

Recirculation ducts 114, 116, 118, 120, 122, 124 are provided to recirculate exhaust fluids from furnace 12, preheater 16, charger 18 and cyclonic separator 20 within system 10. Recirculation duct 114 transmits a portion of the exhaust fluids from preheater 16 (via cyclonic separator 20) to flue channel 100 through air intake duct 104. Recirculation duct 116 transmits another portion of the exhaust fluids from preheater 16 (via cyclonic separator 20) to recirculation duct 120. Recirculation duct 118 transmits yet another portion of the exhaust fluids from preheater 16 (via cyclonic separator 20) directly to preheater 16 and extends from fan 30 to bypass inlet 86 of preheater 16. Recirculation duct 120 transmits a portion of the mixed exhaust gases of furnace 12 and preheater 16 (along with ambient air) for use in preheater 16 and charger 18. Duct 120 extends from an outlet of flue channel 100 to primary inlet 82 of preheater 16. Recirculation duct 122 intersects duct 120 between the flue channel outlet and the primary inlet 82 of preheater 16 and directs a portion of the fluid mixture in recirculation duct 120 to feed chamber 90 of charger 18. Finally, recirculation duct 124 also intersects duct 120 between the flue channel outlet and the preheater primary inlet 82 and directs exhaust fluids from hopper 88 and mixing chamber 90 of charger 18 to duct 120.

Bypass ducts 126, 128 are provided to redirect portions of fluids from recirculation ducts 122, 120, respectively, for specific uses. Bypass duct 128 extends between recirculation ducts 118, 120 and directs a portion of the fluid mixture in recirculation duct 120 to recirculation duct 118. Bypass duct 128 is connected to recirculation duct 120 between the flue channel outlet and the primary inlet 82 of preheater 16 and is connected to recirculation duct 118 between fan 30 and the bypass inlet 86 of preheater 16. Bypass duct 126 extends between recirculation duct 122 and charger exhaust duct 112 and directs a portion of the fluid mixture in recirculation duct 122 to charger exhaust duct 112 in order to maintain temperatures within charger exhaust ducts 110, 112 at a predetermined level to avoid condensation within ducts 110, 112.

Fans 24, 26, 28, 30 are provided to draw fluids from one location and direct those fluids to another location within system 10. Fans 24, 26, are provided to input ambient air from the atmosphere into air intake duct 104 for mixing with furnace exhaust fluids in flue channel 100. Fan 28 is provided to draw exhaust fluids from hopper 88 and feed chamber 90 of charger 18 and transmit those fluids into recirculation duct 124 for mixture with other exhaust fluids from furnace 10 and preheater 16 used in preheating batch materials in preheater 16. Fan 30 is provided to draw exhaust fluids from preheater 16 (through cyclonic separator 20) and direct those fluids to recirculation ducts 114, 116, 118. In accordance with one aspect of the present disclosure discussed hereinbelow, the speed of fan 30 may be controlled in order to control exhaust fluid mass flow and temperatures within system 10.

Valves 32, 34, 36, 38, 40, 42, 44, 46, 48, 50, 52, 54, 56, 58 are provided to control fluid flow within the ducts of duct system 22. Valves 32, 34, 36, 38, 40, 42, 44, 46, 48, 50, 52, 54, 56, 58 may comprise butterfly valves and the position of each valve may be changed using conventional electromechanical controls under the direction of controllers such as controllers 70, 72, 74, 76, 77. Valve 32 is provided to control the amount of ambient air introduced to air intake duct 104 (and ultimately to flue channel 100). Valve 34 is provided to control the amount of exhaust fluids from preheater 16 (through cyclonic separator 20) that are introduced from recirculation duct 114 to air intake duct 104 (and ultimately flue channel 100). Valve 36 is provided to control the amount of fluids from air intake duct 104 introduced into flue channel 100. Valve 38 is provided to control the amount of fluids introduced from flue channel 100 into recirculation duct 120. Valve 40 is provided to control the amount of exhaust fluids from preheater 16 (through cyclonic separator 20) that are introduced from recirculation duct 116 into recirculation duct 120. Valve 42 is provided to control the amount of fluids introduced into recirculation duct 120 from flue channel 100 and recirculation duct 116 that are transmitted downstream to devices such as preheater 16 and charger 18. Valve 44 is provided to control the amount of fluids that are transmitted from recirculation duct 120 downstream through recirculation duct 122 to charger 18. Valves 46, 48 are provided to control the amount of fluids that are transmitted from recirculation duct 122 to feed chamber 90 of charger 18 and through bypass duct 126 to recirculation duct 112. Valves 50, 52 are provided to control the amount of exhaust fluids introduced from hopper 88 and feed chamber 90, respectively, of charger 18 to recirculation duct 110. Valve 54 is provided to control the amount of exhaust fluids introduced from recirculation duct 124 into recirculation duct 120. Valve 56 is provided to control fluid flow from fan 30 to bypass inlet 86 of preheater 16 and, in particular, the amount of exhaust fluids from preheater 16 (through cyclonic separator 20) that are transmitted to bypass inlet 86 of preheater 16. Finally, valve 58 is provided to control the amount of the exhaust fluid mixture in recirculation duct 120 that is redirected from primary inlet 82 of preheater 16 to bypass inlet 86 of preheater 16. In accordance with various aspects of the present disclosure discussed hereinbelow, the positions of one or more of valves 34, 40, 44, 56, and 58 may be controlled in order to control exhaust fluid mass flow and temperatures within system 10.

Pressure sensor 60 comprises a differential pressure sensor and is provided to measure the drop in pressure between inlet 92 and outlet 96 of cyclonic separator 20. Pressure sensor 62 is provided to measure the pressure in recirculation duct 114. Sensors 60, 62 may comprise any of a variety of conventional pressure sensors including piezoresistive, piezoelectric, capacitive, resonant or other sensors. Pressure sensor 60 generates a pressure signal indicative of a drop in pressure between inlet 92 and outlet 96 of cyclonic separator 20 and provides that signal to controller 70. Pressure sensor 62 generates a pressure signal indicative of the pressure in duct 114 and provides that signal to controller 76. Although the illustrated embodiment shows selected pressure sensors relevant to the present disclosure, it should be understood that other pressure sensors may be disposed throughout system 10 and used in various control processes.

Temperature sensors 64, 66, 68 are provided to measure the temperature of fluids at various locations within duct system 22. Sensors 64, 66, 68 may comprise any of a variety of conventional temperature sensors including thermistors or thermocouples. Sensor 64 measures the fluid temperature of the exhaust fluids immediately downstream of outlet 96 of cyclonic separator 20. Sensor 64 generates a temperature signal indicative of a temperature at outlet 96 of cyclonic separator 20 and provides that signal to controllers 70, 72, 74. Temperature sensors 66, 68 are provided to measure the temperature of fluids at two locations within recirculation duct 120. Temperature sensor 66 measures the temperature of fluids in duct 120 at a location upstream of temperature sensor 68. Temperature sensors 66, 68 generate temperature signals indicative of temperatures of fluids within duct 120 and provide those signals to controllers 76, 77. Although the illustrated embodiment shows selected temperature sensors relevant to the present disclosure, it should again be understood that other temperature sensors may be disposed throughout system 10 and used in various control processes.

Controllers 70, 72, 74, 76, 77 are configured to control various components within system 10. In the illustrated embodiments, particular controllers will be described for use in controlling fan 30 and valves 34, 40, 44, 56, 58. It should be understood, however, that additional controllers may be used within system 10 for control of other system components. Further, although controllers 70, 72, 74, 76, 77 are illustrated as separate controllers in the illustrated embodiment, it should be understood that one or more of controllers 70, 72, 74, 76, 77 may be integrated into a single controller and that one or more of controllers 70, 72, 74, 76, 77 may be subdivided into yet additional controllers responsible for a subset of tasks associated with a particular controller. Controllers 70, 72, 74, 76, 77 may comprise programmable microprocessors or application specific integrated circuits (ASICs). Controllers 70, 72, 74, 76, 77 may include central processing units (CPU) and input/output (I/O) interfaces through which the controllers 70, 72, 74, 76, 77 may receive of input signals including signals generated by sensors 60, 62, 64, 66, 68 and generate output signals including those used to control fan 30 and valves 34, 40, 44, 56, 58. In accordance with the teachings disclosed herein, controllers 70, 72, 74, 76, 77 may be configured (encoded) with sets of executable instructions from a computer program (i.e. software) to perform methods for controlling the mass flow and temperature of exhaust fluids within portions of system 10 and, in particular, for controlling fan 30 and valves 34, 40, 44, 56, 58 to achieve control of the mass flow and temperatures.

Cyclonic flow controller 70 is provided to control fan 30 and, in particular, the speed of fan 30 in order to control the mass flow of exhaust fluids through preheater 16 and cyclonic separator 20. Controller 70 is configured to receive input signals from pressure sensor 60, temperature sensor 64 and temperature controller 72. Controller 70 is further configured to generate an output signal used to control fan 30 responsive to the pressure signal from pressure sensor 60 and the temperature signal from temperature sensor 64. In particular, controller 70 is configured to determine an actual flow rate through cyclonic separator 20 responsive to the pressure signal (which evidences a drop in pressure across cyclonic separator 20) and temperature signal (where increases in temperature are indicative of increases in mass flow). Controller 70 is further configured to receive a target flow rate signal from temperature controller 72 indicative of a desired fluid flow rate through cyclonic separator 20. The target flow rate signal is intended to reflect batch materials throughput rate (furnace pull rate multiplied by bath materials ratio) and batch materials quality (e.g., size and moisture content). The target flow rate can be set by an operator of system 10. As set forth hereinbelow, however, temperature controller 72 may also be configured to establish the target flow rate based on one or more variables in system 10. Controller 70 is further configured to adjust the speed of fan 30 if the actual flow rate meets a predetermined condition relative to the target flow rate. For example, if the actual flow rate exceeds the target flow rate, controller 70 may generate a control signal configured to reduce the speed of fan 30. If the actual flow rate is less than the target flow rate, controller 70 may generate a control signal configured to increase the speed of fan 30. Controller 70 may implement a proportional-integral-derivative (PID) control algorithm for this purpose. Finally, controller 70 may be configured to establish predetermined speeds for fan 30 during predefined events including startup and shutdown of system 10 and during emergencies.

Figure 2:
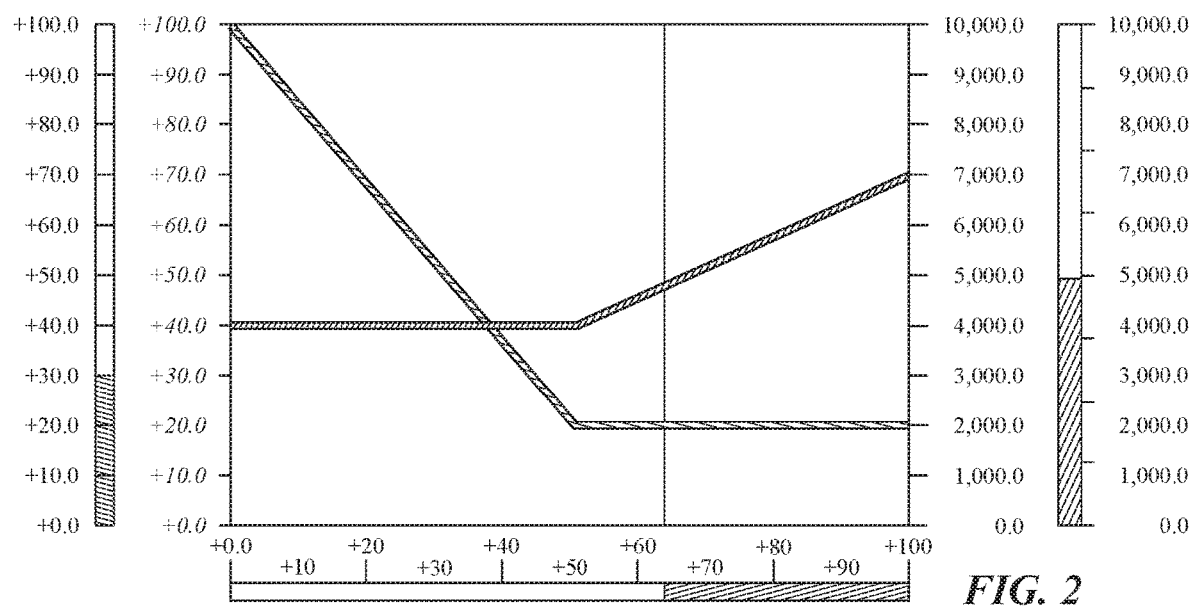
FIG. 2 is a graph depicting a split range control profile of target flow rate and valve position in accordance with one embodiment of the present teachings.

Temperature controller 72 is provided to control the temperature of exhaust fluids through ducts 106, 108 in order to protect the ductwork, cyclonic separator 20 and fan 30 and to optimize energy transfer to batch materials in preheater 16. Controller 72 is configured to receive an input signal from temperature sensor 64 (controller 72 may also receive an operator input indicative of a desired target flow rate). Controller 72 is configured to generate output signals in the form of a target flow rate signal indicative of a desired target flow rate and a valve control signal indicative of a commanded position for valve 56. As set forth hereinabove, in certain circumstances the target flow rate signal may be responsive to an operator input selected based on factors including batch materials throughput rate and batch materials quality. Controller 72, however, also has a mode of operation in which it is configured to generate a target flow rate responsive to the temperature measured by sensor 64 proximate outlet 96 of cyclonic separator 20. Controller 72 may be configured to implement the mode in which the target flow rate signal is generated responsive to the measured temperature from sensor 64—as opposed to using the operator input—under a variety of circumstances including, for example, if the measured temperature varies from a desired temperature more than a predetermined amount or shows signs of rapid change over time. Controller 72 is also configured to generate a valve control signal for controlling a position of valve 56 responsive to the temperature signal. Valve 56 can be used to control temperature in ducts 106, 108 by controlling the amount of exhaust fluids from preheater 16 that are recirculated to bypass inlet 86 of preheater 16. Because fan 30 controls the flow rate through preheater 16 and the flow is constant at a constant fan speed, changing the position of valve 56 to increase or decrease the flow through bypass inlet 86 of preheater 16 causes a corresponding decrease or increase, respectively, in the amount of exhaust gases that are drawn into preheater 16 from recirculation duct 120. In this manner, opening valve 56 to increase flow through duct 118 to bypass inlet 86 of preheater 16 reduces the flow from duct 120 to inlet 82 and the temperature of the exhaust fluids exiting outlet 84 of preheater 16. Conversely, closing valve 56 to decrease flow through duct 118 to bypass inlet 86 of preheater 16 increases the flow from duct 120 to inlet 82 and the temperature of the exhaust fluids exiting outlet 84 of preheater 16. In an alternative embodiment, controller 72 could be configured to control a valve (not shown) that directs ambient air into the mass flow entering, within, or exiting preheater 16 to control the temperature. Referring to FIG. 2, in accordance with some embodiments, controller 72 may be configured to generate the target flow rate signal and valve control signal in accordance with a predefined split range control profile. The use of a split range control profile allows smooth, bumpless transfer of the manipulation of both the target flow rate and valve position by establishing a mathematical relationship between the two values. In the illustrated profile, valve 56 moves from a fully open position towards a closed position dependent on the extent of the desired temperature increase in ducts 106, 108. At a certain point, the profile establishes a minimum open position (about 20% open) despite the desire for further temperature increases so that some fluids are always flowing through duct 118 to prevent condensation within duct 118. The target flow rate assumes a predetermined minimum value (established to create the required air flow for separating particulates within cyclonic separator 20) until the commanded temperature increase exceeds a predetermined value at which point the target flow rate gradually increases dependent on the desired temperature increase up to a predetermined maximum flow rate. In the illustrated profile, the target flow rate begins to increase from its minimum flow rate at the same point that valve 56 reaches its minimum open position. It should be understood, however, that the profile may vary such that both the target flow rate and the valve position are changing simultaneously over some range of temperature values. Finally, controller 72 may be configured to establish predetermined positions for valve 56 during predefined events including startup and shutdown of system 10 and during emergencies.

Bypass valve controller 74 is provided increase the heat in ducts within duct system 22 including ducts 106, 108 during startup of preheater 16 in order to protect the ductwork from exposure to condensation. Controller 74 is configured to receive an input signal from temperature sensor 64. Controller 74 is further configured to generate an output signal used to control valve 58 responsive to the signal from temperature sensor 64. Valve 58 is configured to control fluid flow from recirculation duct 120, which carries exhaust fluids from the glass melting furnace sent through flue channel 100, to bypass inlet 86 of preheater 16. By directing these exhaust fluids to bypass inlet 86, the fluids bypass some of the batch materials and the heat is instead routed directly through outlet 84 of preheater 16 instead of being transferred to the batch materials. In this manner, various ducts within duct system 22, including ducts 106, 108, will heat up more quickly. Thus, when the temperature at outlet 96 indicated by temperature sensor 64 is relatively low, bypass controller 74 is configured to open valve 58. As the temperature increases, the valve 58 may move towards a closed position or remain fully open depending on the control strategy employed. Once the temperature reaches a predetermined threshold, however, controller 74 is configured to generate a control signal for valve 58 that closes valve 58. This threshold temperature may be less than the temperature at which temperature controller 72 implements control of the target flow rate and valve 58. For example, bypass valve controller 74 may act on valve 58 for temperatures under 120 degrees Celsius while temperature controller 72 begins to act when temperatures exceed 150 degrees Celsius. Controller 74 may again be configured to establish predetermined positions for valve 58 during predefined events including startup and shutdown of system 10 and during emergencies.

Figure 3:
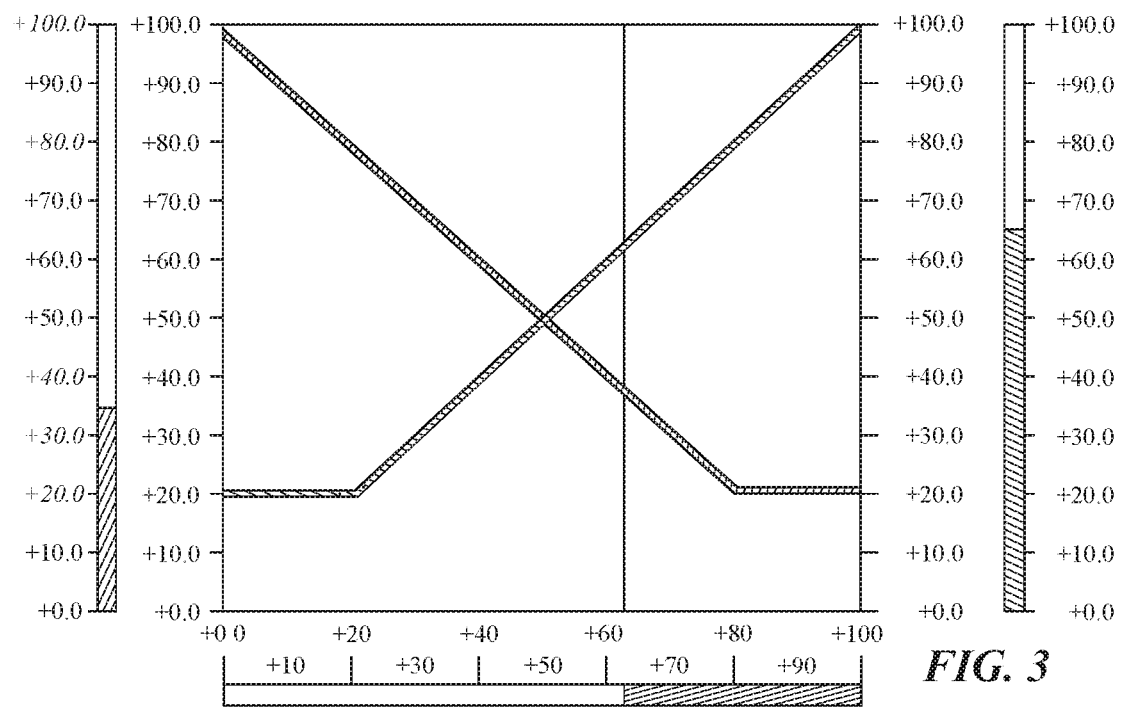
FIG. 3 is a graph depicting a split range control profile of valve positions in accordance with one embodiment of the present teachings.

Inlet temperature controller 76 is provided to control the temperature of the fluid mixture in recirculation duct 120 leading to inlet 82 of preheater 16 in order to optimize energy transfer from the fluids to the batch materials in preheater 16 and to protect duct 120. Inlet temperature controller 76 is configured to receive input signals from temperature sensors 66, 68 and to generate output signals used in controlling valves 34, 40. Valve 34 controls the amount of exhaust fluids from preheater 16 that are transmitted to the flue channel 100 for mixing with exhaust fluids from furnace 12 in order to control the temperature of the mixture in flue channel 100 and protect downstream energy recovery and emissions abatement equipment. Valve 40 controls the amount of exhaust fluids from preheater 16 that are introduced to recirculation duct 120 in order to control the temperature of the fluid mixture in duct 120. Referring to FIG. 3, in accordance with one aspect of the present disclosure, controller 76 may generate valve control signals for valves 34, 40 in accordance with a predefined split range control profile. The use of a split range control profile establishes a mathematical relationship between the position of the two valves 34, 40 that prevents the movement of one of valves 34, 40 from impacting the position of the other of valves 34, 40 and makes the split flow of exhaust gases in ducts 114, 116 independent of the plenum pressure downstream of fan 30. In the illustrated profile, as the measured temperature changes, controller 76 will output control signals to increase the opening of one of valves 34, 40, while reducing the opening of the other of valves 34, 40. Increasing the opening of valve 40 will direct a greater portion of the exhaust fluids from preheater 16 into recirculation duct 120 as opposed to flue channel 100. Because the exhaust fluids from preheater 16 are cooler than the exhaust fluids exiting the flue channel 100, this action will reduce the temperature of the fluid mixture in recirculation duct 120 and at inlet 82 to preheater 16. Conversely, increasing the opening of valve 34 will direct a greater portion of the exhaust fluids from preheater 16 into flue channel 100 as opposed to recirculation duct 120. This action will increase the temperature of the fluid mixture in recirculation duct 120 and at inlet 82 to preheater 16. Thus, in the illustrated profile, once the measured temperature exceeds a predetermined threshold, any further increases will lead to a proportional increase in the opening of valve 40 from a minimum opening position to a fully open position. Conversely, as the temperature increases, the opening of valve 34 is proportionally reduced from a fully open position until it reaches a minimum opening position. Each valve 34, 40 has a minimum opening position (i.e., is never fully closed) so that there is always at least some exhaust fluid flow through recirculation ducts 114, 116 in order to prevent undesirable cooling and condensation in the ducts 114, 116. It should be understood that the illustrated profile is exemplary only and that the minimum and maximum opening positions, rates of increase/decrease and positioning of valves 34, 40 relative to one another may be varied. Controller 76 may also be configured to establish predetermined positions for valves 34, 40 during predefined events including startup and shutdown of system 10, and during emergencies.

In accordance with one aspect of the control of temperatures in duct 120, controller 76 may generate control signals for valves 34, 40 responsive to the temperature signals generated by either of temperature sensors 66, 68. Temperature sensor 68 measures the temperature of the fluid mixture in duct 120 proximate inlet 82 of preheater 16 and controller 76 will typically generate control signals for valves 34, 40 responsive to the measured temperature indicated by temperature sensor 68 in order to optimize energy transfer to the batch materials in preheater 16. Temperature sensor 66 measures the temperature of the fluid mixture in duct 120 at a position upstream of temperature sensor 68 and nearer to the entry point of exhaust fluids from flue channel 100 into duct 120. Controller 76 may be configured to generate control signals for valves 34, 40 responsive to the measured temperature from sensor 66 when the measured temperature indicates a relatively high temperature that has the potential to damage duct 120 and nearby valves. Controller 76 may be configured to select one of the temperature signals from sensors 66, 68 to use in establishing control signals for valves 34, 40 based on various control strategies. In accordance with one embodiment, controller 76 generates control signals for valves 34, 40, responsive to the temperature signal from sensor 68 unless the temperature indicated by sensor 66 meets a predetermined condition. In particular, controller 76 generates control signals for valves 34, 40, responsive to the temperature signal from sensor 68 unless the temperature indicated by sensor 66 exceeds the temperature indicated by sensor 68 by more than a predetermined amount. Because the temperature measured by sensor 66 should always be higher than the temperature measured by sensor 68 (by virtue of the relative locations of the sensors in the stream of exhaust fluids), controller 76 may compare the temperatures measured by sensors 66, 68 using a predetermined offset and base control of valves 34, 40 on the temperature measured by sensor 68 unless the temperature at sensor 66 exceeds the temperature at sensor 68 by more than the offset. Once controller 76 selects a temperature signal from sensors 66, 68 for use in controlling valves 34, 40, controller 76 may be configured to implement a PID controller to compare the measured temperature to a desired temperature and generate a value indicative of the difference that can be used in generating the control signals for valves 34, 40, in accordance with the predefined profile referred to above.

In accordance with another aspect of the present teachings, inlet temperature controller 76 may be configured to control the pressure in recirculation duct 114 by controlling the minimum opening position of valves 34, 40. As set forth above, each of valves 34, 40, preferably has a minimum opening position to allow some flow of exhaust fluids through each of ducts 114, 116 in order to maintain the temperatures within the ducts above a predetermined level to prevent condensation in the ducts 114, 116. In one embodiment, each of valves 34, 40 may have a minimum opening of at least twenty percent (20%) relative to a fully open position. Controller 76 may be configured to adjust the minimum opening positions of valves 34, 40, responsive to the pressure signal from pressure sensor 62 in order to increase or reduce fluid flow through ducts 114, 116. In one embodiment, controller 76 may be configured to compare the pressure in duct 114 indicated by pressure sensor 62 to a predetermined threshold pressure and to increase the minimum opening of each of valves 34, 40 if the pressure in duct 114 meets a predetermined condition relative to the predetermined threshold pressure (e.g., if the pressure in duct 114 exceeds the predetermined threshold pressure).

Charger temperature controller 77 is provided to control the temperatures in charger 18 and charger exhaust duct 112 in order prevent condensation in charger 18 and duct 112. Charger temperature controller 77 is configured to receive input signals from temperature sensors 66, 68 and to generate output signals used in controlling valve 44. Valve 44 controls the amount of exhaust fluids from furnace 12 and preheater 16 that is diverted from recirculation duct 120 into recirculation duct 122 for the purpose of controlling the temperatures of charger 18 and charger exhaust duct 112. Because temperature sensor 66 measures the temperature of the fluid mixture in duct 120 upstream of the location at which recirculation duct 124 joins recirculation duct 120 and temperature sensor 68 measures the temperature of the fluid mixture in duct 120 downstream of the location at which duct 124 joins duct 120 (i.e., after the introduction of exhaust fluids from hopper 88 and feed chamber 90 of charger 18 via duct 124), the difference in temperatures measured by sensors 66, 68 is indicative of the temperature of the exhaust fluids from hopper 88 and feed chamber 90 of charger 18 and, therefore, the temperature of charger 18. Controller 77 may be configured to control the position of valve 44 responsive to the temperature readings from sensors 66, 68 in order to control the temperatures in charger 18 and in charger exhaust duct 112 (e.g., to maintain the temperature of charger 18 and/or duct 112 above predetermined temperatures to prevent condensation within charger 18 and/or duct 112).

A system for preheating batch materials in accordance with the present teachings is advantageous relative to conventional systems. In particular, the inventive system enables efficient transfer of energy from exhaust fluids to batch materials in the preheater 16 while also protecting ducts in the duct system 22 leading to and from the preheater 16 and other components from excessive temperatures.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

What is claimed is:

1. A system for preheating batch materials prior to delivery to a glass melting furnace, comprising:
   a preheater configured to receive unheated batch materials and to deliver heated batch materials, the preheater including an outlet configured to exhaust fluid from the preheater and an inlet configured to receive exhaust fluid from the glass melting furnace and exhaust fluid recirculated from the outlet of the preheater;
   a furnace flue including a furnace exhaust gas inlet, a flue outlet, and a flue inlet between the furnace exhaust gas inlet and the flue outlet, and wherein the furnace flue is configured to receive exhaust fluid from the preheater at the flue inlet of the furnace flue;
   a fan configured to provide ambient air to the furnace flue;
   a valve configured to control an amount of the ambient air to the furnace flue;
   a temperature sensor configured to sense temperature of exhaust gases in the furnace flue;
   a temperature controller configured to control the valve and the fan responsive to the temperature sensed by the temperature sensor;
   a recirculation duct extending from the flue outlet to the inlet of the preheater;
   an air intake duct configured to transmit fluid from the preheater and the fan and introduce the fluid to the furnace flue at the flue inlet and the flue outlet from which the recirculation duct extends;
   a first preheater exhaust fluid valve configured to control an amount of exhaust fluid from the preheater to the flue inlet of the furnace flue;
   an ambient air and exhaust fluid mixture valve configured to control an amount of a mixture of ambient air and exhaust fluid from the preheater to the furnace flue; and
   a second preheater exhaust fluid valve configured to control an amount of exhaust fluid through the recirculation duct,
   wherein the temperature controller controls the first and second preheater exhaust fluid valves in accordance with a predefined split range control profile.

2. The system of claim 1 wherein the temperature controller controls the fan and the valve in accordance with a predefined split range control profile.

3. The system of claim 1 wherein the temperature controller is configured to maintain the valve at least partially open at all times.

4. The system of claim 1 wherein the temperature controller is configured to increase or maintain fan speed while opening the valve.

5. The system of claim 1 further comprising a duct disposed between the furnace flue and preheater, wherein the furnace flue is configured to receive exhaust fluid from the preheater, exhaust fluid from the glass melting furnace, and the ambient air provided by the fan, and further wherein a mixture of the exhaust fluid from the preheater, the exhaust fluid from the glass melting furnace, and the ambient air in the furnace flue is transmitted to the preheater through the duct.

6. The system of claim 5 further comprising a valve configured to control an amount of the mixture of the exhaust fluid from the preheater, the exhaust fluid from the furnace flue, and the ambient air in the furnace flue to the duct.

7. The system of claim 1, wherein the fan is configured to provide the ambient air to the furnace flue in a location of the furnace flue that is upstream of an outlet of the furnace flue.

8. The system of claim 1, wherein the first preheater exhaust fluid valve is in fluid communication with a first recirculation duct that recirculates exhaust fluids from the preheater to a location upstream of the furnace flue, and wherein the second preheater exhaust fluid valve is in fluid communication with a second recirculation duct that recirculates exhaust fluids from the preheater to a location downstream of the furnace flue.

9. The system of claim 8, further comprising a fan to draw exhaust fluids from the preheater and direct exhaust fluids to the first and second recirculation ducts.

10. The system of claim 8, further comprising a third valve to control exhaust fluids introduced into the recirculation duct from the furnace flue and from the second recirculation duct.

11. The system of claim 10, further comprising a fourth valve upstream of the third valve to control exhaust fluids from the furnace flue to the recirculation duct.

12. A system for preheating batch materials prior to delivery to a glass melting furnace, comprising:
- a preheater configured to receive unheated batch materials and to deliver heated batch materials, the preheater including an outlet configured to exhaust fluid from the preheater and an inlet configured to receive exhaust fluid from the glass melting furnace and exhaust fluid recirculated from the outlet of the preheater;
- a fan configured to provide ambient air to a furnace flue;
- a valve configured to control an amount of the ambient air to the furnace flue;
- a temperature sensor configured to sense temperature of exhaust gases in the furnace flue;
- a temperature controller configured to control the valve and the fan responsive to the temperature sensed by the temperature sensor;
- an air intake duct configured to receive exhaust fluid from the preheater and the ambient air provided by the fan, and wherein the valve is a first valve configured to control an amount of ambient air to the air intake duct;
- a second valve configured to control an amount of exhaust fluid from the preheater to the air intake duct; and
- a third valve configured to control an amount of a mixture of ambient air and exhaust fluid from the preheater in the air intake duct to the furnace flue.

13. The system of claim 12 further comprising a duct disposed between the furnace flue and the preheater, wherein the furnace flue is configured to receive from the air intake duct a first mixture of ambient air and exhaust fluid from the preheater, and further wherein a second mixture in the furnace flue of exhaust fluid from the glass melting furnace and the first mixture received from the air intake duct is transmitted to the preheater through the duct.

14. The system of claim 13 further comprising a valve configured to control an amount of the second mixture in the furnace flue to the duct.

15. The system of claim 12, further comprising:
- a first recirculation duct that recirculates exhaust fluids from the preheater to a location upstream of the furnace flue, wherein the second valve is in fluid communication with the first recirculation duct;
- a second recirculation duct that recirculates exhaust fluids from the preheater to a location downstream of the furnace flue;
- a third recirculation duct between the furnace flue and the preheater; and
- a fourth valve in fluid communication with the second recirculation duct to control exhaust fluids from the preheater to the third recirculation duct.

16. The system of claim 15, further comprising a fan to draw exhaust fluids from the preheater and direct exhaust fluids to the first and second recirculation ducts.

17. The system of claim 15, further comprising a fifth valve to control exhaust fluids introduced into the third recirculation duct from the furnace flue and from the third recirculation duct.

18. The system of claim 17, further comprising a sixth valve upstream of the fifth valve to control exhaust fluids from the furnace flue to the third recirculation duct.

* * * * *